(12) United States Patent
Bae et al.

(10) Patent No.: US 12,500,970 B2
(45) Date of Patent: Dec. 16, 2025

(54) ELECTRONIC DEVICE INCLUDING WIRE

(71) Applicant: Samsung Electronics Co., Ltd., Suwon-si (KR)

(72) Inventors: Bumhee Bae, Suwon-si (KR); Myunghoi Kim, Suwon-si (KR); Minseok Kim, Suwon-si (KR); Younho Kim, Suwon-si (KR); Jongwan Shim, Suwon-si (KR); Kwangmo Yang, Suwon-si (KR); Jeongnam Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 18/394,663

(22) Filed: Dec. 22, 2023

(65) Prior Publication Data

US 2024/0179230 A1 May 30, 2024

Related U.S. Application Data

(63) Continuation of application No. PCT/KR2023/016660, filed on Oct. 25, 2023.

(30) Foreign Application Priority Data

Oct. 25, 2022 (KR) .................. 10-2022-0138706
Dec. 8, 2022 (KR) .................. 10-2022-0170763

(51) Int. Cl.
*G06F 1/16* (2006.01)
*H01P 3/12* (2006.01)
(Continued)

(52) U.S. Cl.
CPC ............ *H04M 1/0274* (2013.01); *H01P 3/12* (2013.01); *H04M 1/0277* (2013.01)

(58) Field of Classification Search
CPC .. H04M 1/0274; H04M 1/0277; H04M 1/026; G06F 1/1633; G06F 1/1626; H01P 3/12
See application file for complete search history.

(56) References Cited

U.S. PATENT DOCUMENTS 7,808,439 B2  10/2010  Yang et al.
8,669,834 B2   3/2014  Cheng et al.
(Continued)

FOREIGN PATENT DOCUMENTS

KR        10-0867150 B1    10/2008
KR    10-2018-0019472 A     2/2018
(Continued)

OTHER PUBLICATIONS

International Search Report and Written Opinion dated Jan. 23, 2024, issued in International Patent Application No. PCT/KR2023/016660.

(Continued)

*Primary Examiner* — Anthony M Haughton
(74) *Attorney, Agent, or Firm* — Jefferson IP Law, LLP

(57) ABSTRACT

An electronic device including wires is provided. The electronic device, which includes multiple wires through which direct current (DC) power and at least one radio frequency (RF) signal are transmitted, includes an RF transmitter configured to transmit the RF signal, and a power transmitter configured to transmit the DC power. The power transmitter includes a first power conductor including a conductive material, a second power wire including a conductive material and electrically spaced apart from the first power conductor in a first direction, a power conductor disposed between the first power conductor and the second power wire in parallel with the second power wire and electrically (Continued)

spaced apart from the second power wire, and at least one first via electrically connecting the first power conductor and the power conductor.

23 Claims, 16 Drawing Sheets

(51) Int. Cl.
*H04M 1/02* (2006.01)
*H05K 5/00* (2025.01)
*H05K 7/00* (2006.01)

(56) References Cited

U.S. PATENT DOCUMENTS

| | | | |
|---|---|---|---|
| 9,615,445 | B2 | 4/2017 | Hu et al. |
| 10,624,209 | B2 | 4/2020 | Kim et al. |
| 11,206,730 | B2 | 12/2021 | Coakley et al. |
| 11,412,608 | B2 | 8/2022 | Blanc |
| 11,617,257 | B2 | 3/2023 | Lee et al. |
| 11,936,115 | B2 * | 3/2024 | Kim ............... H01Q 21/28 |
| 2005/0029632 | A1 | 2/2005 | Mckinzie, III et al. |
| 2009/0085691 | A1 | 4/2009 | Kim et al. |
| 2016/0336638 | A1 | 11/2016 | Dong et al. |
| 2017/0188451 | A1 | 6/2017 | Hu et al. |
| 2018/0053981 | A1 | 2/2018 | Bae et al. |
| 2018/0288889 | A1 * | 10/2018 | Fordham ............ H01M 50/557 |
| 2019/0387649 | A1 * | 12/2019 | Hong ................. H05K 9/0032 |
| 2020/0127404 | A1 * | 4/2020 | Seo .................... H01Q 5/42 |
| 2020/0185802 | A1 | 6/2020 | Mlenskiy et al. |
| 2021/0044029 | A1 * | 2/2021 | Yoon ................. H05K 1/165 |
| 2021/0111472 | A1 | 4/2021 | Myers et al. |
| 2021/0126344 | A1 * | 4/2021 | Jeon ................... H01Q 1/38 |
| 2021/0392739 | A1 * | 12/2021 | Hong ................. H04M 1/0277 |
| 2022/0104356 | A1 * | 3/2022 | Min ................... H04M 1/0277 |
| 2022/0131571 | A1 | 4/2022 | Lukyanov et al. |
| 2022/0151070 | A1 | 5/2022 | Lee et al. |
| 2022/0200120 | A1 | 6/2022 | Chayat |
| 2022/0322522 | A1 | 10/2022 | Lee et al. |
| 2022/0384934 | A1 * | 12/2022 | Son .................... H01Q 1/38 |
| 2023/0051681 | A1 * | 2/2023 | Jang .................. H01Q 5/314 |
| 2023/0129591 | A1 * | 4/2023 | Kim ................... H05K 1/02 |
| | | | 361/679.01 |
| 2023/0361483 | A1 * | 11/2023 | Yun ................... H01Q 21/065 |
| 2023/0397326 | A1 | 12/2023 | Jo et al. |
| 2024/0283157 | A1 * | 8/2024 | Yun ................... H01Q 9/045 |

FOREIGN PATENT DOCUMENTS

| | | |
|---|---|---|
| KR | 10-2064115 B1 | 2/2020 |
| KR | 10-2021-0062188 A | 5/2021 |
| KR | 10-2302499 B1 | 9/2021 |
| KR | 10-2021-0149496 A | 12/2021 |
| KR | 10-2366495 B1 | 2/2022 |
| WO | 2021/020701 A1 | 2/2021 |
| WO | 2022/240088 A1 | 11/2022 |

OTHER PUBLICATIONS

European Search Reported dated Oct. 2, 2025, issued in European Patent Application No. 23883095.4.

\* cited by examiner

ELECTRONIC DEVICE INCLUDING WIRE

CROSS-REFERENCE TO RELATED APPLICATION(S)

This application is a continuation application, claiming priority under § 365(c), of an International application number PCT/KR2023/016660, filed on Oct. 25, 2023, which is based on and claims the benefit of a Korean patent application number 10-2022-0138706, filed on Oct. 25, 2022, in the Korean Intellectual Property Office, and of a Korean patent application number 10-2022-0170763, filed on Dec. 8, 2022, in the Korean Intellectual Property Office, the disclosure of each of which is incorporated by reference herein in its entirety.

TECHNICAL FIELD

The disclosure relates to electronic devices. More particularly, the disclosure relates to electronic devices including a wire.

BACKGROUND ART

An electronic device includes a circuit board providing a space for placement of electrical components, such as integrated circuits, passive elements, sensors, and connection cables, and circuit wires for electrical connection to the electrical components. The electrical components are directly disposed on a surface of the circuit board or electrically connected to the circuit board via cables.

A cable for transmitting a signal or supplying power, such as a coaxial cable, a ribbon cable, or a flexible cable, may be located inside the electronic device. The flexible cable is used because it is thin and has good flexibility and conformability, which are advantageous for miniaturization of the electronic device.

Via wires of a circuit board or a flexible cable, power (e.g., direct current (DC) or alternating current (AC) power) may be supplied, a ground may be provided, or various signals such as radio frequency (RF) signals may be transmitted.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In order to downsize an electronic device and/or reduce the area of a circuit board, it may be necessary to design a power wire and an RF wire to be adjacent to each other. However, when an RF wire, a power wire, and/or a ground wire are disposed adjacent to each other, a cross-talk phenomenon that RF signals leak from the RF wire through the power wire or the ground wire due to electromagnetic interference (EMI) may occur, causing problems such as noise or malfunction. When shielding is added to prevent this, the sizes and costs of cables and/or circuit boards may increase.

Aspects of the disclosure are to address at least the above-mentioned problems and/or disadvantages and to provide at least the advantages described below. Accordingly, an aspect of the disclosure is to provide an electronic device including wires configured to transmit an RF signal and a power and reduce crosstalk.

Additional aspects will be set forth in part in the description which follows and, in part, will be apparent from the description, or may be learned by practice of the presented embodiments.

Solution to Problem

In accordance with an aspect of the disclosure, an electronic device, which includes multiple wires through which DC power and at least one RF signal are transmitted is provided. The electronic device includes an RF signal circuit configured to transmit the RF signal, and a power transmitter configured to transmit the DC power. The power transmitter includes a first power wire including a conductive material, a second power wire including a conductive material and electrically spaced apart from the first power wire in a first direction, a power conductor disposed between the first power wire and the second power wire in parallel with the second power wire and electrically spaced apart from the second power wire, and at least one first via electrically connecting the first power wire and the power conductor.

In various embodiments, the second power wire and the power conductor may be configured to have a capacitance value, the first via may be configured to have an inductance value, and the capacitance and inductance values may be configured to filter a frequency of the RF signal.

In various embodiments, a width of the second power wire and a distance between the second power wire and the power conductor may be configured such that a capacitor constituted with the second power wire and the power conductor has the capacitance value.

In various embodiments, the power transmitter includes a plurality of first vias, and the number of the first vias and an arrangement interval between adjacent ones of the first vias may be configured such that the plurality of first vias have the inductance value equivalently.

In various embodiments, the first vias may be arranged in a plurality of rows in a direction in which the first power wire extends, and the number of rows may be configured such that the plurality of first vias have the inductance value equivalently.

In various embodiments, the RF signal circuit includes a first conductor having one surface oriented in the first direction, a second conductor located in parallel to the first conductor in the first direction with respect to the first conductor, and a substrate-integrated waveguide including a plurality of second vias located at edges of the first conductor and the second conductor and electrically connecting the first conductor and the second conductor.

In various embodiments, the electronic device includes a plurality of RF signal circuits, the RF signal circuits may be disposed side by side with the power transmitter, and the power transmitter may be located between the plurality of RF signal circuits.

In various embodiments, the electronic device includes a flexible printed cable, and the flexible printed cable includes a first layer having one surface oriented in the first direction, a second layer disposed in parallel to the first layer in the first direction with respect to the first layer, a third layer disposed in parallel to the second layer in the first direction with respect to the second layer, and an insulating material including an electrically insulating and flexible material and disposed between adjacent ones of the first layer, the second layer, and the third layer. The first power wire may be disposed on the first layer, the second power wire may be disposed on the third layer, and the power conductor may be disposed on the second layer.

In various embodiments, the flexible printed cable includes the RF signal circuit disposed side by side with the first to power conductors, and the RF power transmitter includes a first conductor disposed side by side with the first power wire on the first layer, a second conductor disposed side by side with the power conductor on the second layer, a third conductor disposed side by side with the power conductor on the third layer, a plurality of second vias electrically connecting an edge of the first conductor and an edge of the second conductor, and a plurality of third vias electrically connecting an edge of the third conductor and the edge of the second conductor. The first conductor, the second conductor, and the second vias may define a first substrate-integrated waveguide, and the second conductor, the third conductor, and the third vias may define a second substrate-integrated waveguide.

In various embodiments, the flexible printed cable includes a fourth layer disposed between the first layer and the second layer.

In accordance with another aspect of the disclosure, a cable for an electronic device is provided. The cable includes an RF signal circuit configured to transmit an RF signal, and a power transmitter configured to transmit electric power. The power transmitter includes a first power wire including a conductive material, a second power wire including a conductive material and electrically spaced apart from the first power wire in a first direction, a power conductor disposed between the first power wire and the second power wire in parallel with the second power wire and electrically spaced apart from the second power wire, and at least one first via electrically connecting the first power wire and the power conductor.

In various embodiments, the second power wire and the power conductor may be configured to have a capacitance value, the first via may be configured to have an inductance value, and the capacitance and inductance values may be configured to filter a frequency of the RF signal.

In various embodiments, the width of the second power wire and the distance between the second power wire and the power conductor may be configured such that a capacitor constituted with the second power wire and the power conductor has the capacitance value.

In various embodiments, the power transmitter includes a plurality of first vias, and the number of the first vias and an arrangement interval between adjacent ones of the first vias may be configured such that the plurality of first vias have the inductance value equivalently.

In various embodiments, the first vias may be disposed to have a plurality of rows in a direction in which the first power wire extends, and the number of rows may be configured such that the plurality of first vias have the inductance value equivalently.

In various embodiments, the RF signal circuit includes a first conductor having one surface oriented in the first direction, a second conductor located in parallel to the first conductor in the first direction with respect to the first conductor, and a substrate-integrated waveguide including a plurality of second vias located at edges of the first conductor and the second conductor and electrically connecting the first conductor and the second conductor.

In various embodiments, the electronic device includes a plurality of RF signal circuits, the RF signal circuits may be disposed side by side with the power transmitter, and the power transmitter may be located between the plurality of RF signal circuits.

In various embodiments, the cable includes a first layer having one surface oriented in the first direction, a second layer disposed in parallel to the first layer in the first direction with respect to the first layer, a third layer disposed in parallel to the second layer in the first direction with respect to the second layer, and an insulating material including an electrically insulating and flexible material and disposed between adjacent ones of the first layer, the second layer, and the third layer. The first power wire may be disposed on the first layer, the second power wire may be disposed on the third layer, and the power conductor may be disposed on the second layer.

In various embodiments, the cable includes the RF signal circuit disposed side by side with the first to power conductors, and the RF signal circuit includes a first conductor disposed side by side with the first power wire on the first layer, a second conductor disposed side by side with the power conductor on the second layer, a third conductor disposed side by side with the power conductor on the third layer, a plurality of second vias electrically connecting an edge of the first conductor and an edge of the second conductor, and a plurality of third vias electrically connecting an edge of the third conductor and the edge of the second conductor. The first conductor, the second conductor, and the second vias may define a first substrate-integrated waveguide, and the second conductor, the third conductor, and the third vias may define a second substrate-integrated waveguide.

In various embodiments, the cable includes a fourth layer disposed between the first layer and the second layer.

Advantageous Effects of Invention

According to various embodiments disclosed herein, an equivalent capacitor constituted with the power conductor located between the first power wire and the second power wire and an equivalent inductor constituted with the first vias connecting the first power wire and the power conductor provide an electromagnetic band-gap (EBG) structure to filter RF signals. As a result, it is possible to provide an electronic device in which crosstalk of RF signals is reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
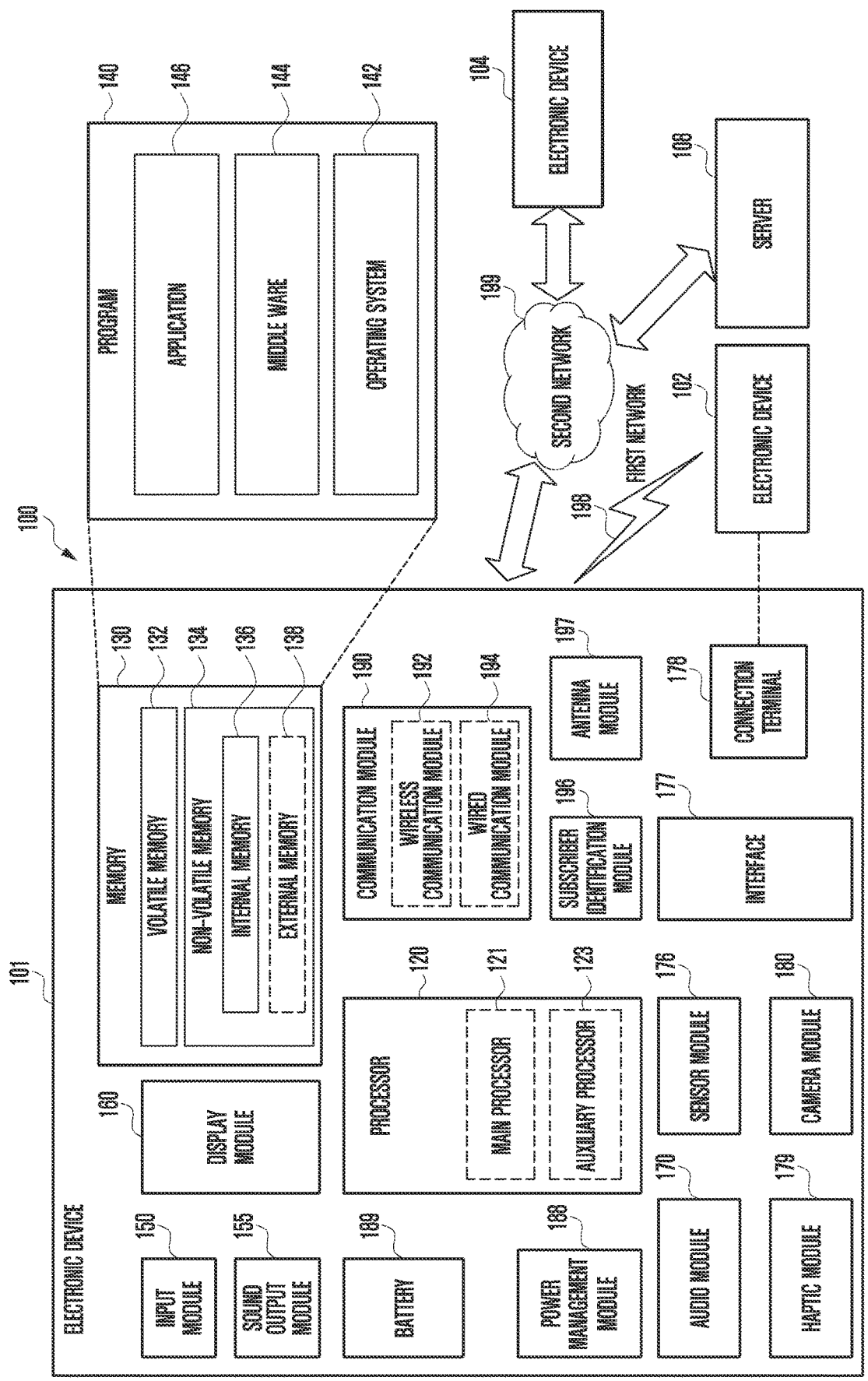
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per Second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (i.e., electronic devices 102 or 104, or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
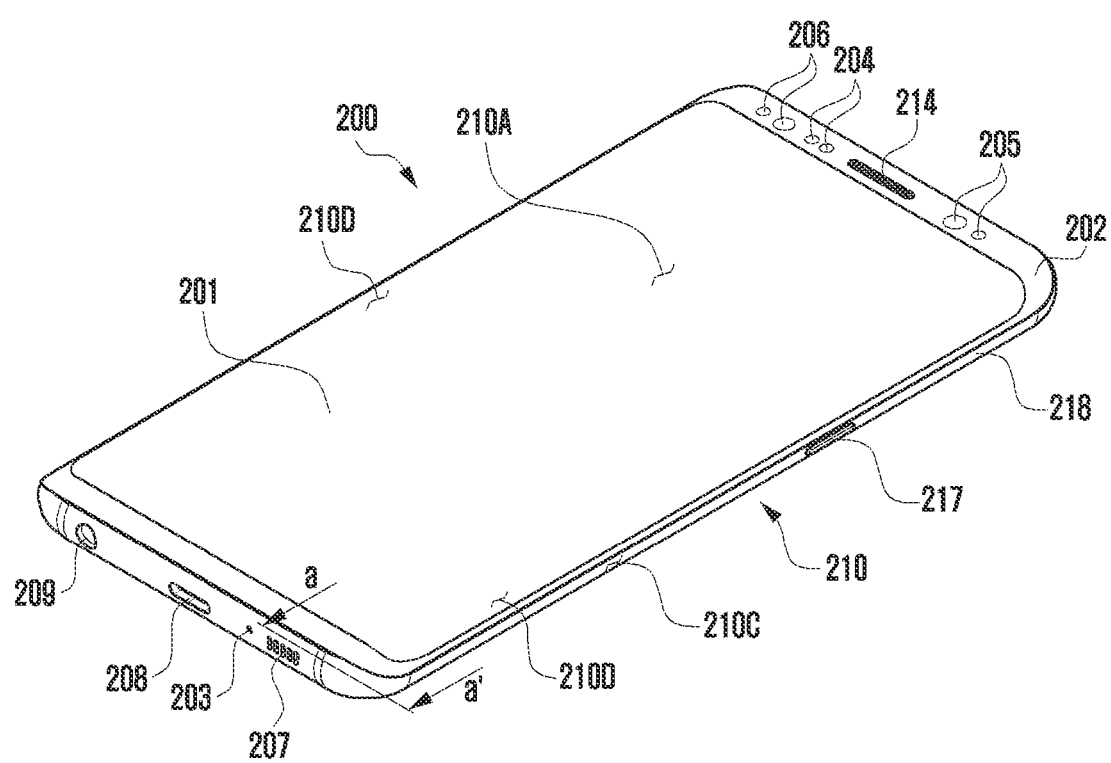
FIG. 2A is a front perspective view of an electronic device according to an embodiment of the disclosure.

FIG. 2A is a front perspective view of an electronic device according to an embodiment of the disclosure.

Figure 2B:
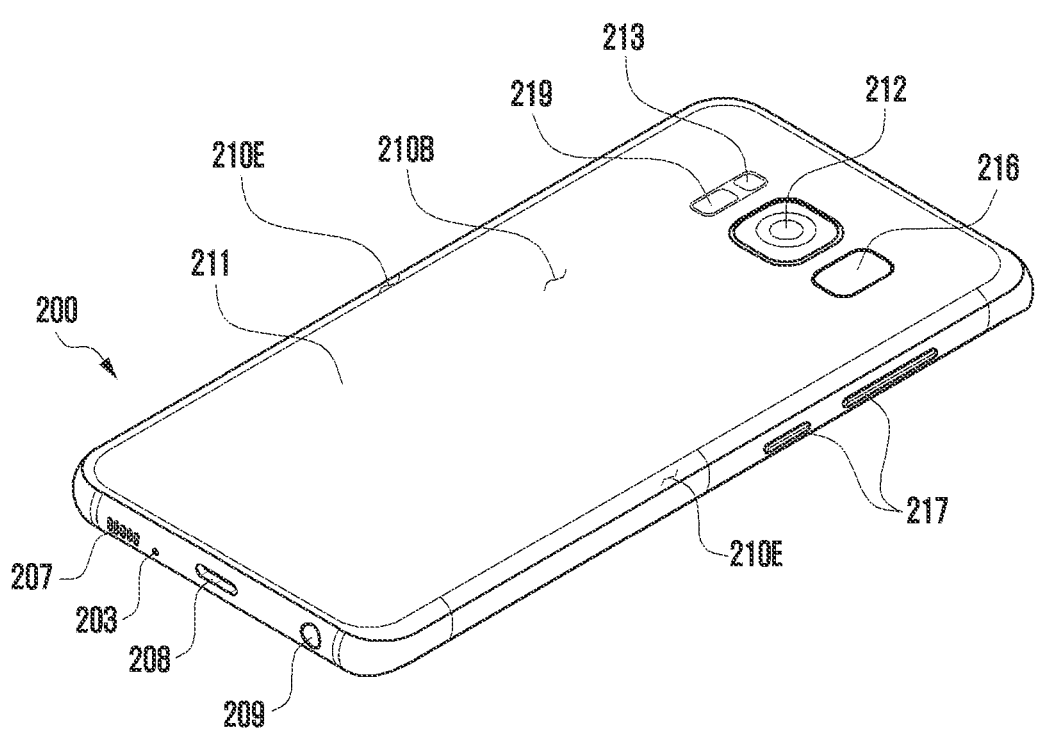
FIG. 2B is a rear perspective view of an electronic device according to an embodiment of the disclosure.

FIG. 2B is a rear perspective view of an electronic device according to an embodiment of the disclosure.

Referring to FIGS. 2A and 2B, an electronic device 200 according to an embodiment may include a housing 210 including a first surface (or a front surface) 210A, a second surface (or a rear surface) 210B, and a side surface 210C surrounding the space between the first surface 210A and the second surface 210B. In another embodiment (not illustrated), the term "housing" may refer to a structure defining some of the first surface 210A, the second surface 210B, and the side surface 210C in FIG. 2A. According to yet another embodiment, at least a portion of the first surface 210A may be defined by a substantially transparent front surface plate 202 (e.g., a glass plate or a polymer plate including various coating layers). The second surface 210B may be defined by a substantially opaque rear surface plate 211. The rear surface plate 211 is made of, for example, coated or colored glass, ceramic, polymer, metal (e.g., aluminum, stainless steel (STS), or magnesium), or a combination of two or more of these materials. The side surface 210C may be defined by a side surface bezel structure (or a "side surface member") 218 coupled to the front surface plate 202 and the rear surface plate 211 and including metal and/or polymer. In some embodiments, the rear surface plate 211 and the side surface bezel structure 218 may be integrally configured and may include the same material (e.g., a metal material such as aluminum).

In the illustrated embodiment, the front surface plate 202 may include, at the long opposite side edges thereof, two first areas 210D, which are bent from the first surface 210A toward the rear surface plate 211 and extend seamlessly. In the illustrated embodiment (see FIG. 2B), the rear surface plate 211 may include, at the long opposite side edges thereof, two second areas 210E, which are bent from the second surface 210B toward the front surface plate 202 and extend seamlessly. In some embodiments, the front surface plate 202 (or the rear surface plate 211) may include only one of the first areas 210D (or the second areas 210E). In another embodiment, some of the first areas 210D or the second areas 210E may not be included. In the above-described embodiments, when viewed from a side of the electronic device 200, the side surface bezel structure 218 may have a first thickness (or width) on the side where the first areas 210D or the second areas 210E are not included, and may have a second thickness, which is smaller than the first thickness, on the side where the first areas 210D or the second areas 210E are included.

According to an embodiment, the electronic device 200 may include at least one of a display 201, audio modules 203, 207, and 214, sensor modules 204, 216, and 219, camera modules 205, 212, and 213, key input devices 217, light-emitting elements 206, and connector holes 208 and 209. In some embodiments, at least one of the components (e.g., the key input devices 217 or the light-emitting elements 206) may be omitted from the electronic device 200, or other components may be additionally included in the electronic device 200.

The display 201 may be visually exposed through a substantial portion of, for example, the front surface plate 202. In some embodiments, at least a portion of the display 201 may be visually exposed through the front surface plate 202, which defines the first surface 210A and the first areas 210D of the side surface 210C. In some embodiments, the edges of the display 201 may be configured to be substantially the same as the shape of the periphery of the front surface plate 202 adjacent thereto. In another embodiment (not illustrated), the distance between the periphery of the display 201 and the periphery of the front surface plate 202 may be substantially constant in order to increase the exposed area of the display 201.

In yet another embodiment (not illustrated), recesses or openings may be provided in a portion of a screen display area of the display 201, and at least one of an audio module 214, a sensor module 204, a camera module 205, and a light-emitting element 206 may be aligned with the recesses or the openings. In yet another embodiment (not illustrated), the rear surface of the screen display area of the display 201 may include at least one of audio modules 214, sensor modules 204, camera modules 205, a fingerprint sensor 216, and light-emitting elements 206. In yet another embodiment (not illustrated), the display 201 may be coupled to or disposed adjacent to a touch-sensitive circuit, a pressure sensor capable of measuring a touch intensity (pressure), and/or a digitizer configured to detect an electromagnetic field-type stylus pen. In some embodiments, at least some of the sensor modules 204 and 219 and/or at least some of the key input devices 217 may be disposed in the first areas 210D and/or the second areas 210E.

The audio modules 203, 207, and 214 may include a microphone hole 203 and speaker holes 207 and 214. The microphone hole 203 may include a microphone disposed therein to acquire external sound, and in some embodiments, a plurality of microphones may be disposed therein to be able to detect the direction of sound. The speaker holes 207 and 214 may include an external speaker hole 207 and a communication receiver hole 214. In some embodiments, the speaker holes 207 and 214 and the microphone hole 203 may be implemented as a single hole, or a speaker may be included without the speaker holes 207 and 214 (e.g., a piezo speaker).

The sensor modules 204, 216, and 219 may generate electrical signals or data values corresponding to an internal operating state of the electronic device 200 or an external environmental state. The sensor modules 204, 216, and 219 includes, for example, a first sensor module 204 (e.g., a proximity sensor) and/or a second sensor module (not illustrated) (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor 216) disposed on the second surface 210B of the housing 210. The fingerprint sensor may be disposed not only on the first surface 210A (e.g., the display 201) of the housing 210, but also on the second surface 210B. The electronic device 200 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, and a second camera device 212 and/or a flash 213 disposed on the second surface 210B of the electronic device 200. The camera devices 205 and 212 may include one or more lenses, an image sensor, and/or an image signal processor. The flash 213 includes, for example, a light-emitting diode or a xenon lamp. In some embodiments, two or more lenses (e.g., an infrared camera, a wide-angle lens, and a telephoto lens), and image sensors may be disposed on one surface of the electronic device 200.

The key input devices 217 may be disposed on the side surface 210C of the housing 210. In another embodiment, the electronic device 200 may not include some or all of the above-mentioned key input devices 217, and the key input devices 217, which are not included, may be implemented in another form, such as soft keys, on the display 201. In some embodiments, the key input devices may include a sensor module 216 disposed on the second surface 210B of the housing 210.

The light-emitting elements 206 may be disposed, for example, on the first surface 210A of the housing 210. The light-emitting elements 206 may provide, for example, the state information of the electronic device 200 in an optical form. In another embodiment, the light-emitting elements 206 may provide a light source that is interlocked with, for example, the operation of the camera module 205. The light-emitting elements 206 may include, for example, a light emitting diode (LED), an IR LED, and a xenon lamp.

The connector holes 208 and 209 may include a first connector hole 208 capable of accommodating a connector (e.g., a USB connector) configured to transmit/receive power and/or data to/from an external electronic device, and a second connector hole (e.g., an earphone jack) 209 capable of accommodating a connector configured to transmit/receive an audio signal to/from an external electronic device.

Figure 3:
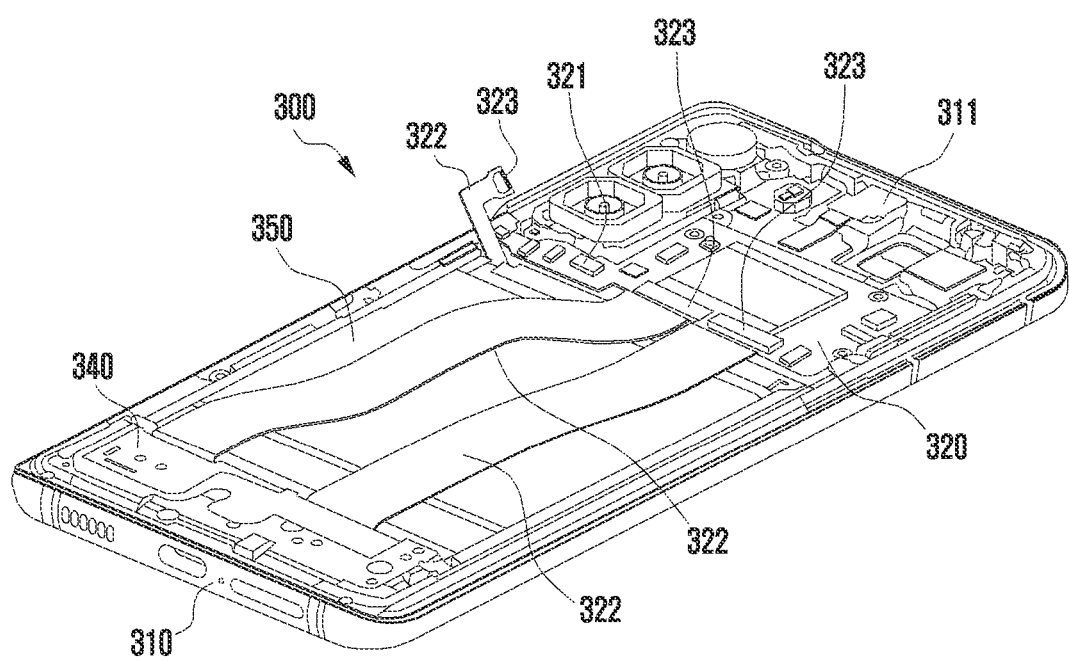
FIG. 3 is a perspective view illustrating an inside of an electronic device according to an embodiment of the disclosure.

FIG. 3 is a perspective view illustrating the inside of an electronic device according to an embodiment of the disclosure.

Referring to FIG. 3, an electronic device 300 may include a side surface bezel structure 310 (e.g., a housing), a support member 311 (e.g., a bracket), a first printed circuit board 320, a second printed circuit board 340, and a battery 350. In some embodiments, in the electronic device 300, at least one of the above-mentioned components may be omitted or other components may be additionally included. At least one of the components of the electronic device 300 may be the same as or similar to at least one of the components of the electronic device 200 of FIG. 2A or 2B, and a redundant description thereof will be omitted below.

The first support member 311 may be disposed inside the electronic device 300 to be connected to the side surface bezel structure 310 (e.g., the housing), or may be configured integrally with the side surface bezel structure 310. The first support member 311 is made of, for example, a metal material and/or a non-metal (e.g., polymer) material. A display (not illustrated) may be coupled to one surface of the first support member 311 and the first and second printed circuit boards 320 and 340 may be coupled to the other surface. A processor, a memory, a sensor, a camera, and/or a female connector 321 may be mounted on the first printed circuit board 320. The processor includes one or more of, for example, a central processor, an application processor, a graphics processor, an image signal processor, a sensor hub processor, or a communication processor. In some embodiments, the first printed circuit board may be a laminated board in which a plurality of PCBs are laminated.

The female connector 321 may be a member that is coupled to a male connector 323 located at a distal end of a cable 322 to electrically connect an electrical component of the electronic device to the cable 322. The term "male" may be used to refer to a connector positioned at the distal end of the cable, and the term "female" may be used to refer to a connector positioned at an object that is electrically connected to the cable. The female connector and the male connector may be coupled by an interference fit by friction or by a snap fit coupling using an elastic lug. In some embodiments, the female connector may have a receiving portion provided with a conductor contact portion, and the male connector may have a terminal received in the female connector to form an electrical contact at the conductor contact portion. However, the disclosure is not limited thereto, and a configuration opposite to the above-described configuration is also possible.

The cable 322 may be a member that interconnects various electrical components of the electronic device, such as the first and second printed circuit boards 320 and 340, an antenna (not illustrated), a camera, and/or a display panel (e.g., the display 201 in FIG. 2A). In some embodiments, the cable 322 may include a ribbon cable, a coaxial cable, a flexible flat cable (FFC), or a flexible printed cable (FPC). A male connector may be disposed at the distal end of the cable.

The second printed circuit board 340 includes other electrical components of the electronic device, for example, an external interface for a power management IC (PMIC), such as an interface (e.g., a USB interface) for transmitting/receiving power and/or data to/from an external electronic device, and/or an interface (e.g., a 3.5 mm earphone jack) for transmitting/receiving an analog audio signal to/from an external electronic device. The second printed circuit board may include a cable 322 to be connected to the first printed circuit board.

The battery 350 is a device for supplying power to at least one component of the electronic device 300, and includes, for example, a non-rechargeable primary battery, a rechargeable secondary battery, or a fuel cell. At least a portion of the battery 350 may be disposed on substantially the same plane as, for example, the first and second printed circuit boards 320 and 340. The battery 350 may be integrally disposed inside the electronic device 300, or may be detachably disposed on the electronic device 300.

The electronic device 300 according to various embodiments may include an electronic device such as a bar type, a foldable type, a rollable type, a sliding type, a wearable type, a tablet personal computer (PC), and/or a notebook PC. The electronic device 300 according to various embodiments of the disclosure is not limited to the above-described examples, and may include various other electronic devices.

Figure 4A:
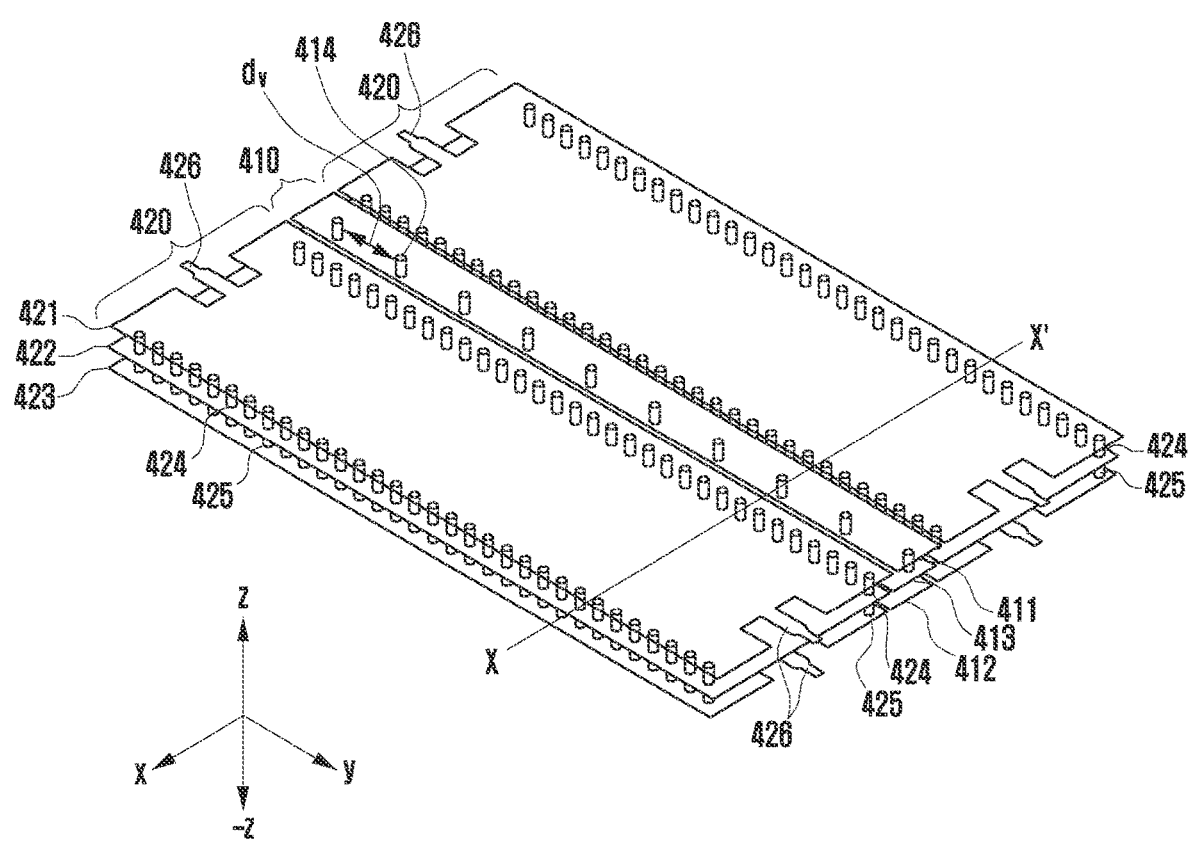
FIG. 4A is a perspective view illustrating an RF signal circuit and a power transmitter of an electronic device according to an embodiment of the disclosure.

FIG. 4A is a perspective view illustrating an RF signal circuit 420 and a power circuit 410 of an electronic device according to an embodiment of the disclosure.

Figure 4B:
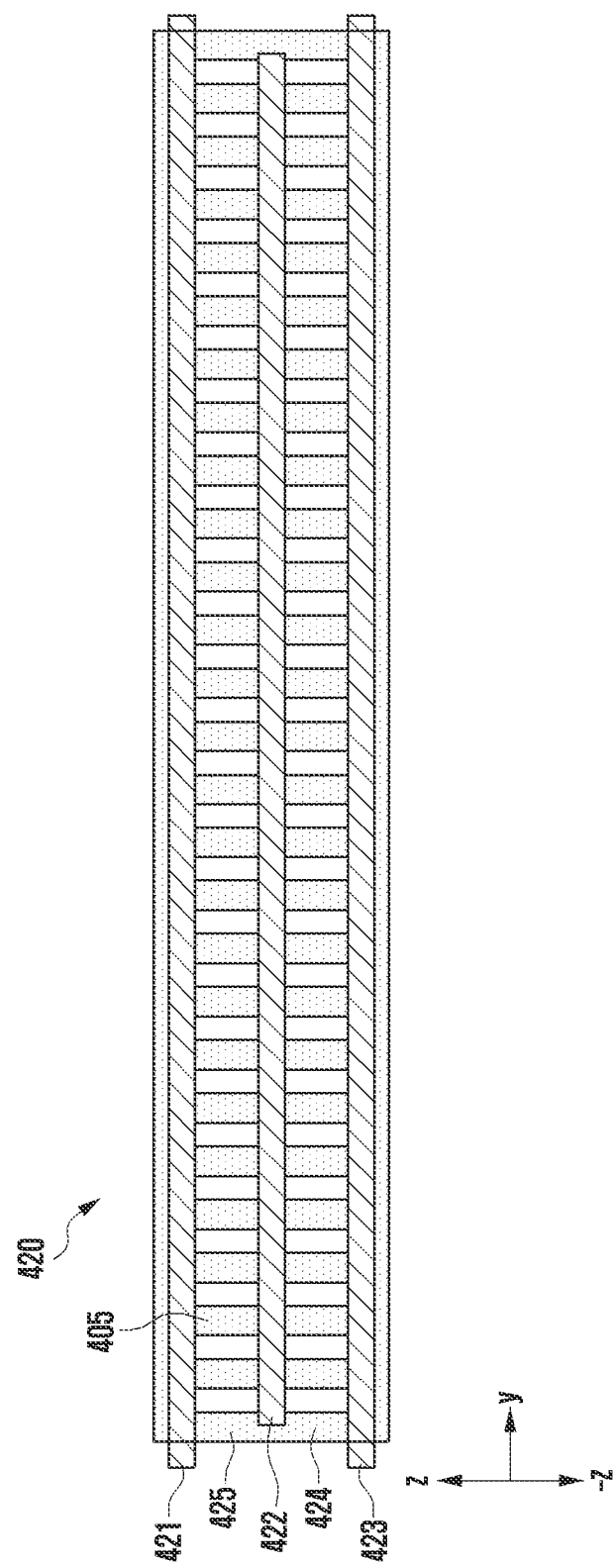
FIG. 4B is a side view illustrating an RF signal circuit of an electronic device according to an embodiment of the disclosure.

FIG. 4B is a side view illustrating a RF signal circuit 420 of an electronic device according to an embodiment of the disclosure.

Figure 4C:
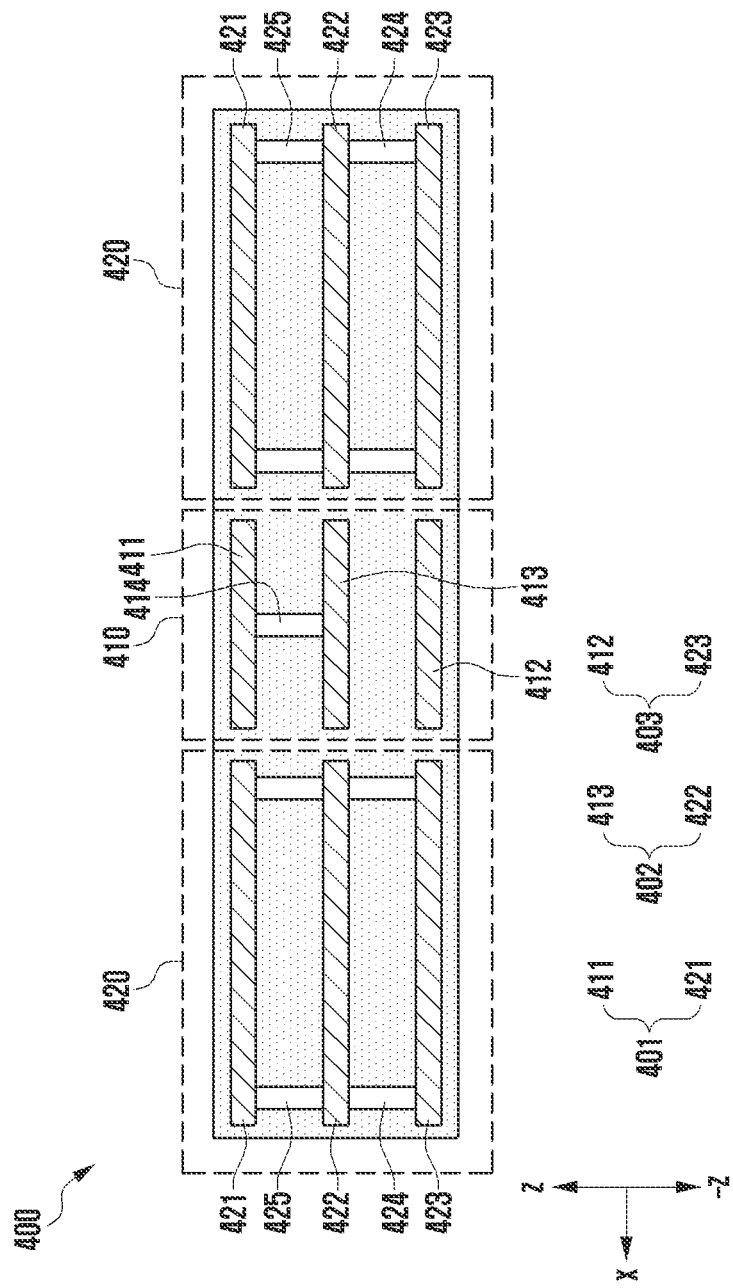
FIG. 4C is a cross-sectional view illustrating an RF signal circuit and a power transmitter of an electronic device according to an embodiment of the disclosure.

FIG. 4C is a cross-sectional view illustrating a RF signal circuit 420 and a power circuit 410 of an electronic device according to an embodiment of the disclosure.

Figure 4D:
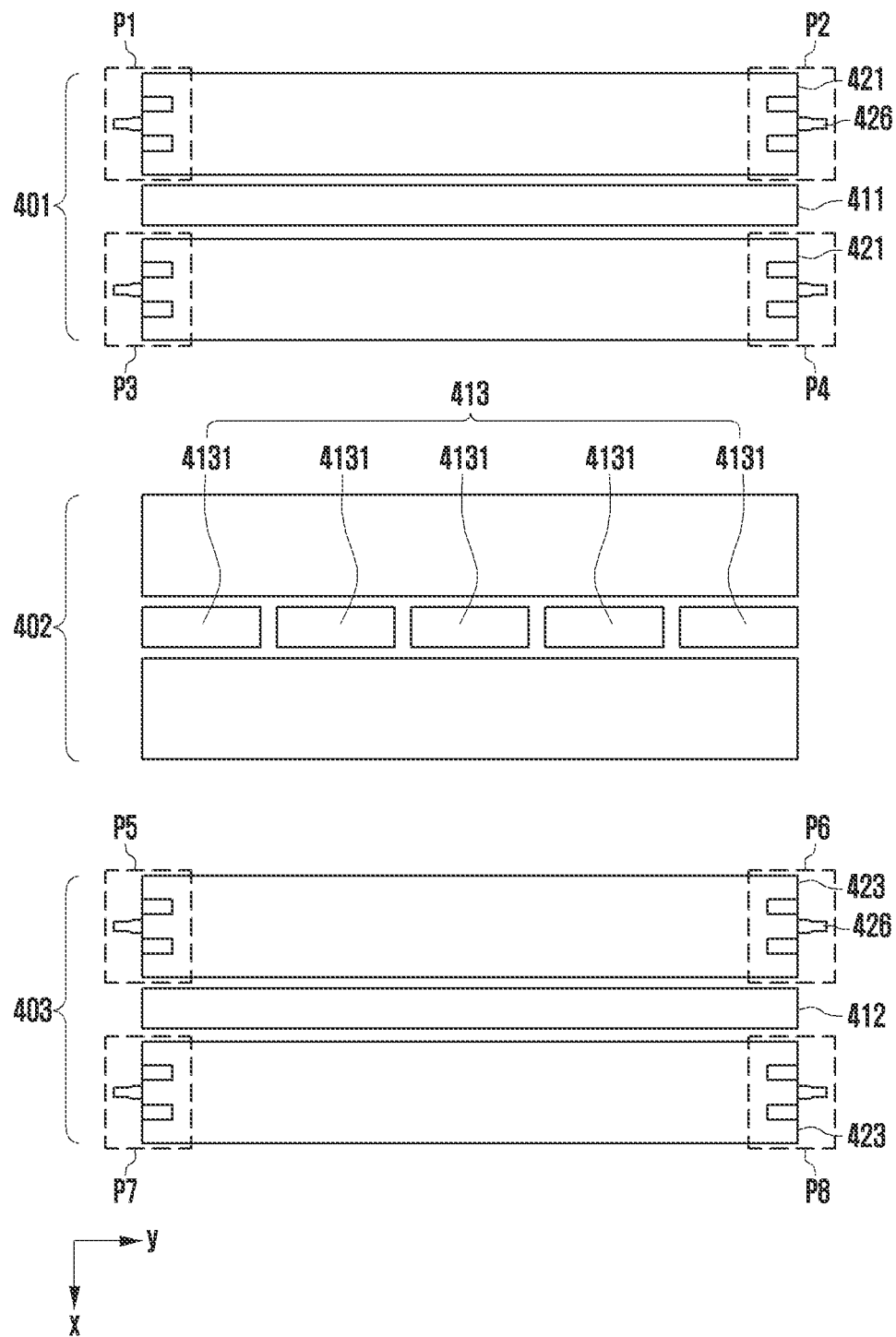
FIG. 4D is a plan view illustrating individual layers of a cable of an electronic device according to an embodiment of the disclosure.

FIG. 4D is a plan view illustrating individual layers of a flexible printed circuit board 400 of an electronic device according to an embodiment of the disclosure.

In FIGS. 4A and 4D, illustration of an insulating material 405 is omitted.

FIG. 4B is a side view of the RF signal circuit of FIG. 4A viewed in the x-axis direction.

The cross section of FIG. 4C is a cross section taken in X-X' direction in FIG. 4A.

Referring to FIGS. 4A, 4B, 4C, and 4D, an electronic device (e.g., the electronic device 200 in FIGS. 2A and 2B or the electronic device 300 in FIG. 3) may include an RF signal circuit 420 and a power circuit 410.

The power circuit 410 may be a component that supplies electric power to various electrical components of the electronic device. In various embodiments, the electric power may be, for example, power supplied in the form of direct current. In some embodiments, the electric power may be power supplied in the form of alternating current. The power circuit 410 may include a first power conductor 411, a second power conductor 412, and a third power conductor 413. The first power conductor 411, the second power conductor 412 and the third power conductor 413 includes, for example, a conductive material, such as copper, silver, aluminum, and/or carbon. The second power conductor 412 may be located under the first wire (in the −z direction, which may be referred to as a "first direction", on the drawing). The third power conductor 413 may be located between the first power conductor 411 and the second power wire 412 and may be arranged to be substantially parallel to the third power conductor 413. Referring to FIG. 4D, in various embodiments, the third power conductor 413 may include a plurality of conducting segments 4131.

In various embodiments, the power circuit 410 may include one or more first vias 414. The one or more first vias 414 may electrically connect the first power conductor 411 and the second power conductor 412 and may be arranged at a constant interval $d_y$ in the direction in which the power circuit 410 extends (e.g., the y direction). Accordingly, the first power conductor 411 and the third power conductor 413 may be electrically connected to each other and may have substantially the same potential, and the second power conductor 412 may have a potential different from that of the first power conductor 411. In various embodiments, the second power conductor 412 of the power circuit 410 operates as a ground wire and the first power conductor 411 and the third power conductor 413 may operate as wires having a voltage. In some embodiments the first power conductor 411 and the third power conductor 413 may operate as ground wires, and the second wire 412 may have a voltage.

The RF signal circuit 420 may be a component configured to transmit an RF signal. In various embodiments, the RF signal circuit 420 may include a substrate-integrated waveguide (SIW). The substrate-integrated waveguide may include a first conductor 421 and a second conductor 422 located in parallel to the first conductor 421, and may include a plurality of second vias 424 that electrically connect the first conductor 421 and the second conductor 422 at edges of the first conductor 421 and the second conductor 422. An RF signal propagation path in the substrate-integrated waveguide may be defined by the first conductor 421, the second conductor 422, and the plurality of second vias 424.

In various embodiments, the electronic device may include a plurality of RF signal circuits 420, wherein the plurality of RF signal circuits 420 may be disposed side by side with the power circuit 410, and the power circuit 410 may be interposed between the plurality of RF signal circuits 420. The effects of this configuration will be described later.

In various embodiments, the electronic device may include a cable 400 (e.g., the cables 322 in FIG. 3). Referring to FIGS. 4B to 4D, in various embodiments, the cable 400 may be a flexible printed cable (FPC) or a flexible printed circuit board (FPCB) having a plurality of layers. The cable 400 may be a flexible printed circuit board electrically connecting a first printed circuit board (e.g. the first printed circuit board 320 in FIG. 3) and a second printed circuit board (e.g. the second printed circuit board 340 in FIG. 3) of the electronic device. In other embodiments, the cable 400 may refer to an area of a printed circuit board (e.g., the first printed circuit board 320 or the second printed circuit board 340 in FIG. 3) in which the power circuit 410 and the RF signal circuit 420 are arranged. For example, the cable 400 may have a multilayer structure that includes a first layer 401, a second layer 402 located under the first layer 401 (in the −z direction, which may be referred to as a "first direction" in the drawing) to be substantially parallel to the first layer 401, and a third layer 403 located under the second layer 402 to be substantially parallel to the second layer 402. An insulating material 405 may be disposed between adjacent ones of the first layer 401, the second layer 402, and the third layer 403. The first power conductor 411 may be disposed on the first layer 401, the power conductor 413 may be disposed on the second layer 402, and the second power conductor 412 may be disposed on the third layer 403.

Referring to FIGS. 4B to 4D, in various embodiments, the RF signal circuit 420 may include a first conductor 421, a second conductor 422, and a third conductor 423. The first conductor 421 and the second conductor 422 may constitute a first substrate-integrated waveguide, and the second conductor 422 and the third conductor 423 may constitute a second substrate-integrated waveguide. A plurality second vias 424 may be provided at edges of the first conductor 421 and the second conductor 422 to constitute the first substrate-integrated waveguide while electrically connecting the first conductor 421 and the second conductor 422, and a plurality of third vias 425 may be provided at edges of the second conductor 422 and the third conductor 423 to constitute the second substrate-integrate waveguide while electrically connecting the second conductor 422 and the third conductor 423. Accordingly, the cable 400 may include a plurality of substrate-integrated waveguides stacked on each other. Accordingly, it is possible to increase the arrangement density of the board-integrated waveguides for the cable 400 having a limited area.

In various embodiments, slot transition structures 426 to be connected to a microstrip line (e.g., a microstrip patch antenna) may be provided at opposite ends of the first conductor 421 and the third conductor 423.

Figure 5A:
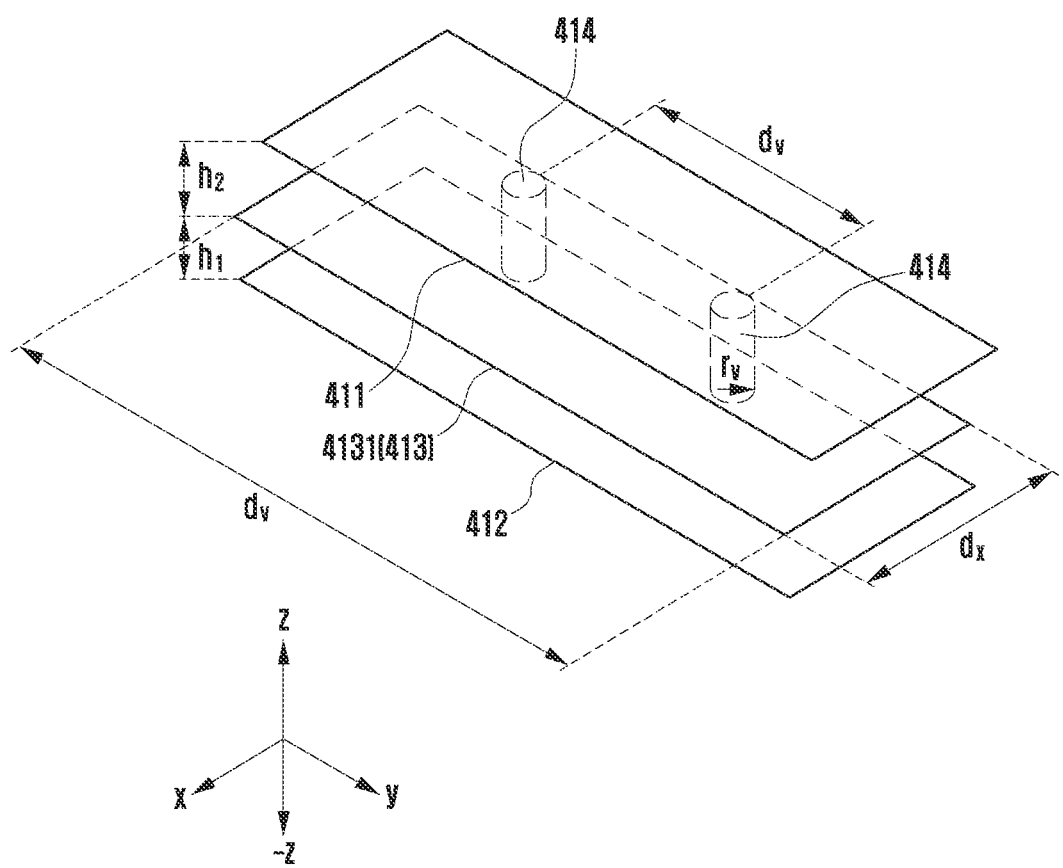
FIG. 5A is a perspective view illustrating a power transmitter according to an embodiment of the disclosure.

FIG. 5A is a perspective view illustrating a power circuit 410 according to an embodiment of the disclosure.

Figure 5B:
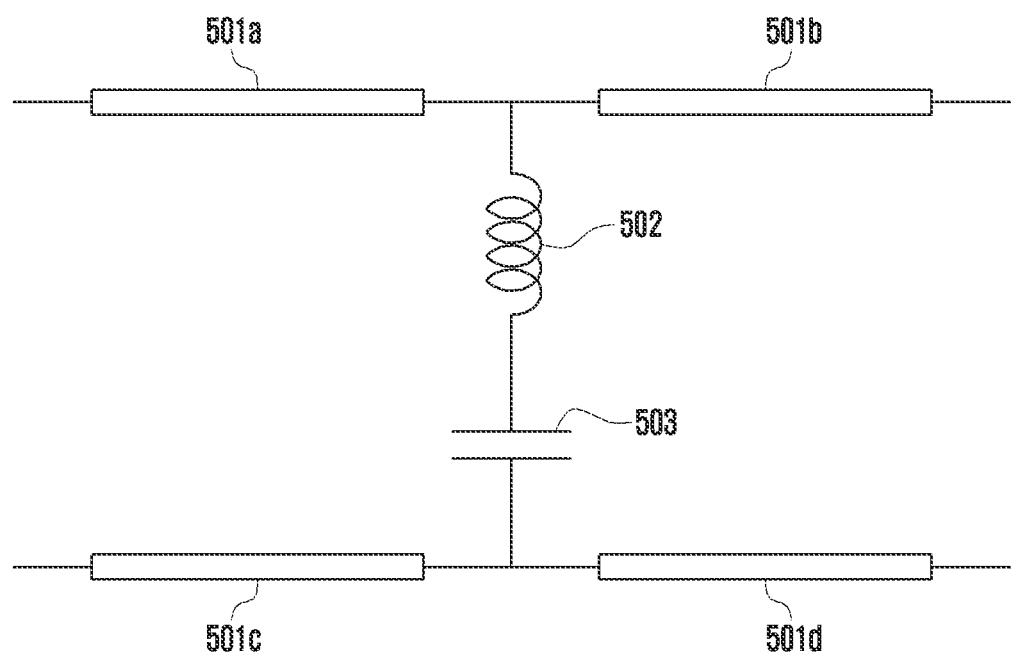
FIG. 5B is a circuit diagram illustrating an equivalent circuit of the power transmitter according to an embodiment of the disclosure.

FIG. 5B is a circuit diagram illustrating an equivalent circuit of a power circuit 410 according to an embodiment of the disclosure.

Referring to FIGS. 5A and 5B, the power circuit 410 may be expressed as an equivalent circuit 500 in which an equivalent capacitor 503 and an equivalent inductor 502 are disposed between a plurality of conducting wire segments 501a, 501b, 501c, and 501d.

The power circuit 410 may act as the equivalent circuit 500 of FIG. 5B when electromagnetic interference (EMI) is applied from the outside of the power circuit 410. For example, when an RF signal is transmitted through the RF signal circuit 420, the electric field and magnetic field may be induced in and around the components of the power circuit 410 by EMI (e.g., noise and/or crosstalk) generated from the RF signal circuit 420. and magnetic fields may be induced. When the electric and magnetic fields are induced, each component of the power circuit 410 and/or a combination thereof may act as a component of the equivalent circuit 500 (e.g. equivalent capacitor 503 and/or equivalent inductor 502).

For example, when EMI is applied to the power circuit 410, an electric field that changes over time may be induced between the second power conductor 412 and the third power conductor 413, which are electrically separated from each other. Accordingly, electric charge may build up on the second power conductor 412 and the third power conductor 413. Also, due to the electric charge build up, current may flow through the first via 414 that is electrically connected to the third power conductor 413, and thus a magnetic field may be induced around the first via 414. Accordingly, the second power conductor 412 and the third power conductor 413 may constitute the equivalent capacitor 503, and the first via 414 may constitute the equivalent inductor 502. In various embodiments, plurality of vias 414 may collectively act as the equivalent inductor 502.

The capacitance value (hereinafter, indicated to as "C") of the equivalent capacitor 503 constituted by the second power conductor 412 and the third power conductor 413 of the power circuit 410 may be calculated as follows.

$$C = \epsilon_0 \epsilon_r \frac{A}{h_1} \qquad \text{Equation 1}$$

In the above equation, $h_1$ is the separation distance between the second power conductor 412 and the third power conductor 413, and A is the area of the third power conductor 413, which corresponds to the product of the width $d_x$ and the length $d_y$ of the second power conductor 412. Based on the above equation, the capacitance value of the equivalent capacitor 503 may be adjusted by adjusting the width of the second power conductor 412 and/or the separation distance between the third power conductor 413 and the second power conductor 412. In particular, since the width $d_x$ of the second power conductor 412 is easy to adjust when the disclosure is implemented in the flexible printed circuit board 400 and/or a printed circuit board, it is easy to adjust the capacitance of the equivalent capacitor 503 of the disclosure.

The first vias 414 of the power circuit 410 may constitute an equivalent inductor 502. The inductive reactance (which may be referred to as "inductance" and will be indicated as "L" below) of the equivalent inductor 502 may be calculated as in the following equation.

$$L = \frac{\mu_0 h_2}{4\pi}\left(2\ln\left(\frac{d_v}{r_v\sqrt{\pi}}\right)+\left(\frac{r_v\sqrt{\pi}}{d_v}\right)^2 - 1\right) \qquad \text{Equation 2}$$

In the above equation, $h_2$ is the separation distance between the first power conductor 411 and the third power conductor 413 and corresponds to the height of the first vias 414. $d_v$ is the interval between adjacent ones of the vias, $v_p$ is the phase velocity of an RF signal, $r_v$ is the radius of the first vias 414. Based on the above equation, the inductive reactance value of the equivalent inductor 502 may be adjusted by adjusting the arrangement interval of the first vias 414 and/or the radius of the vias. The equivalent capacitor 503 and the equivalent inductor 502 may be coupled with other conducting wires of the power circuit 410 to provide an electromagnetic band-gap (EBG) structure.

The power circuit 410 having the aforementioned electromagnetic band-gap structure may act as a filter for one or more frequency band. The filter may be a circuit that blocks and/or attenuates electromagnetic waves in one or more frequency band. The lower cut-off frequency $f_L$ of the electromagnetic band-gap structure may be calculated as in the equation below.

$$f_L = \frac{1}{2\pi}\left(\frac{1}{Z_0 C d_v/4 v_p + LC}\right) \qquad \text{Equation 3}$$

In the above equation, $v_p$ is the phase velocity of an RF signal.

In addition, the upper cut-off frequency $f_U$ may be calculated as in the equation below.

$$\tan\left(\frac{\beta_0 d_y}{2}\right) \approx Z_0 \frac{1}{4\pi f_u L_v} \qquad \text{Equation 4}$$

In the above Equation, $Z_0$ and $\beta_0$ are the characteristic impedance and the phase constant of the conducting wire segments 501a, 501b, 501c, and 501d, and $d_y$ is the length of the second power conductor 412.

As shown in the above equation, the electromagnetic frequency band that can be blocked by the power circuit 410 may be determined by the capacitance value of the equivalent capacitor 503 and the inductive reactance value of the equivalent inductor 502. Therefore, the power circuit 410 may filter a specific frequency band by appropriately configuring the width dx of the second power conductor 412, the separation distance $h_2$ between the second power conductor 412 and the third power conductor 413, the arrangement distance $d_v$ of the first vias 414, and the radius $r_v$ of the second vias 424. The frequency band may be configured to include the frequency band of an RF signal transmitted from the RF signal circuit 420. Thus, it is possible to prevent and/or reduce a crosstalk phenomenon in which electromagnetic waves from the RF signal circuit 420 flow into the power circuit 410. In addition, since the power circuit 410 is disposed side by side between the plurality of RF signal circuits 420, it is also possible prevent and/or reduce crosstalk between the plurality of RF signal circuits 420. In addition, according to the disclosure, it is possible to implement an electromagnetic band-gap structure serving as a filter circuit with only wires and vias, which are components that can be easily disposed in a multi-layered cable. Therefore, even if the electronic device and/or the cable 400 do not include a separate shielding member and/or a filter circuit for the power circuit 410, it is possible to prevent and/or reduce noise and crosstalk, thereby reducing the cost and size of the electronic device.

In light of the effect of the power circuit 410 described above, although FIGS. 4A to 4D illustrate one power circuit 410, but the disclosure is not limited thereto. In various embodiments, the electronic device may include a plurality of RF signal circuits 420 and a plurality of power transmitters 410 disposed side by side with each other, and it will be apparent to those skilled in the art that when the power transmitters 410 are disposed between the plurality of RF signal circuits 420, it is possible to prevent crosstalk between the plurality of RF signal circuits 420.

Figure 6A:
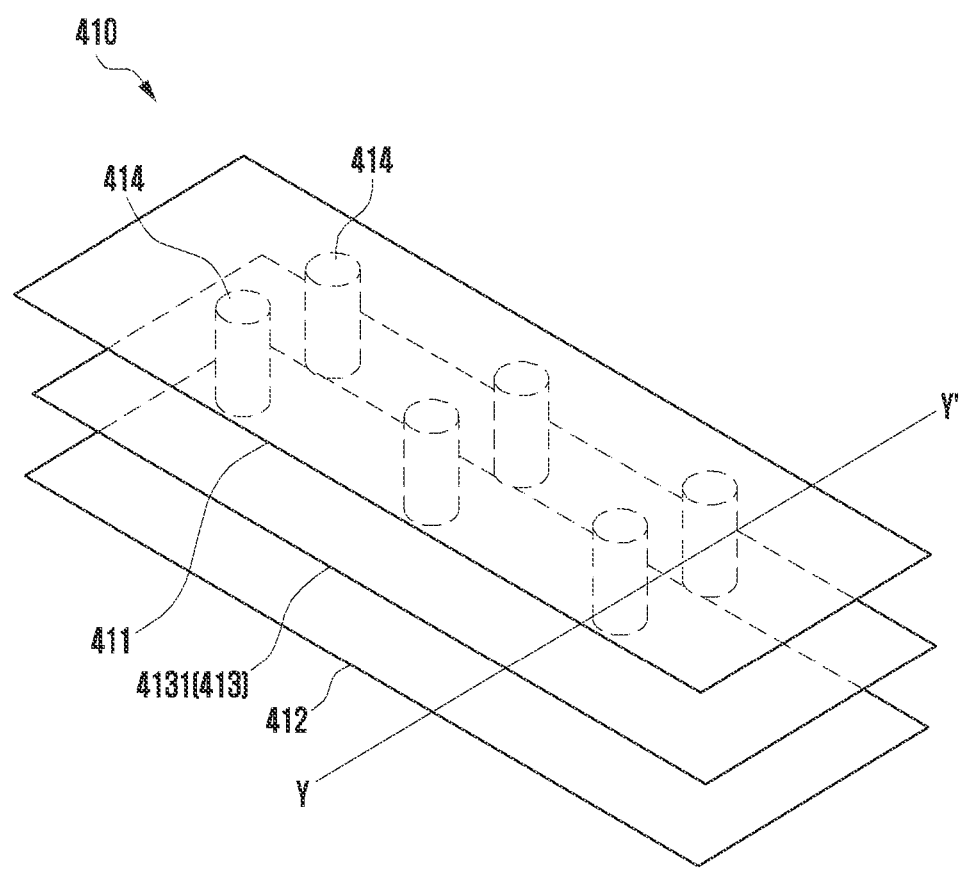
FIG. 6A is a perspective view illustrating a power transmitter according to an embodiment of the disclosure.

FIG. 6A is a perspective view illustrating a power circuit 410 according to an embodiment of the disclosure.

Figure 6B:
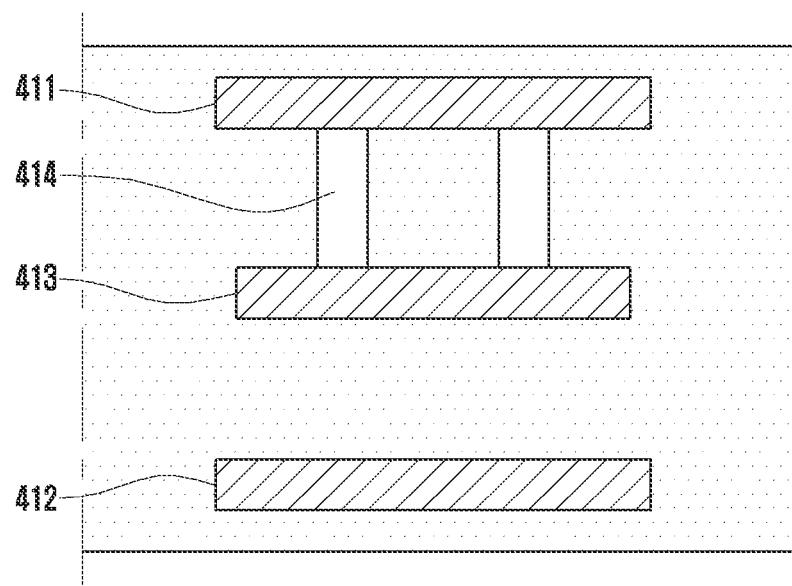
FIG. 6B is a cross-sectional view illustrating a power transmitter according to an embodiment of the disclosure.

FIG. 6B is a cross-sectional view illustrating a power circuit 410 according to an embodiment of the disclosure.

FIG. 6B illustrates a cross section taken in Y-Y' direction in FIG. 6A.

Referring to FIGS. 6A and 6B, the first vias 414 of the power circuit 410 may be arranged in a plurality of rows with reference to the direction in which the power circuit 410 extends. FIGS. 6A and 6B illustrate an embodiment having two rows, but the disclosure is not limited thereto.

Since the plurality of first vias 414 are arranged in a plurality of rows, the arrangement density of the first vias 414 can be easily increased. Thus, it is easy to adjust the inductance of an equivalent inductor 502 constituted with the plurality of first vias 414, and thus it is easy to adjust the frequency range of an RF signal filtered by the electromagnetic band-gap structure of the power circuit 410.

Figure 7A:
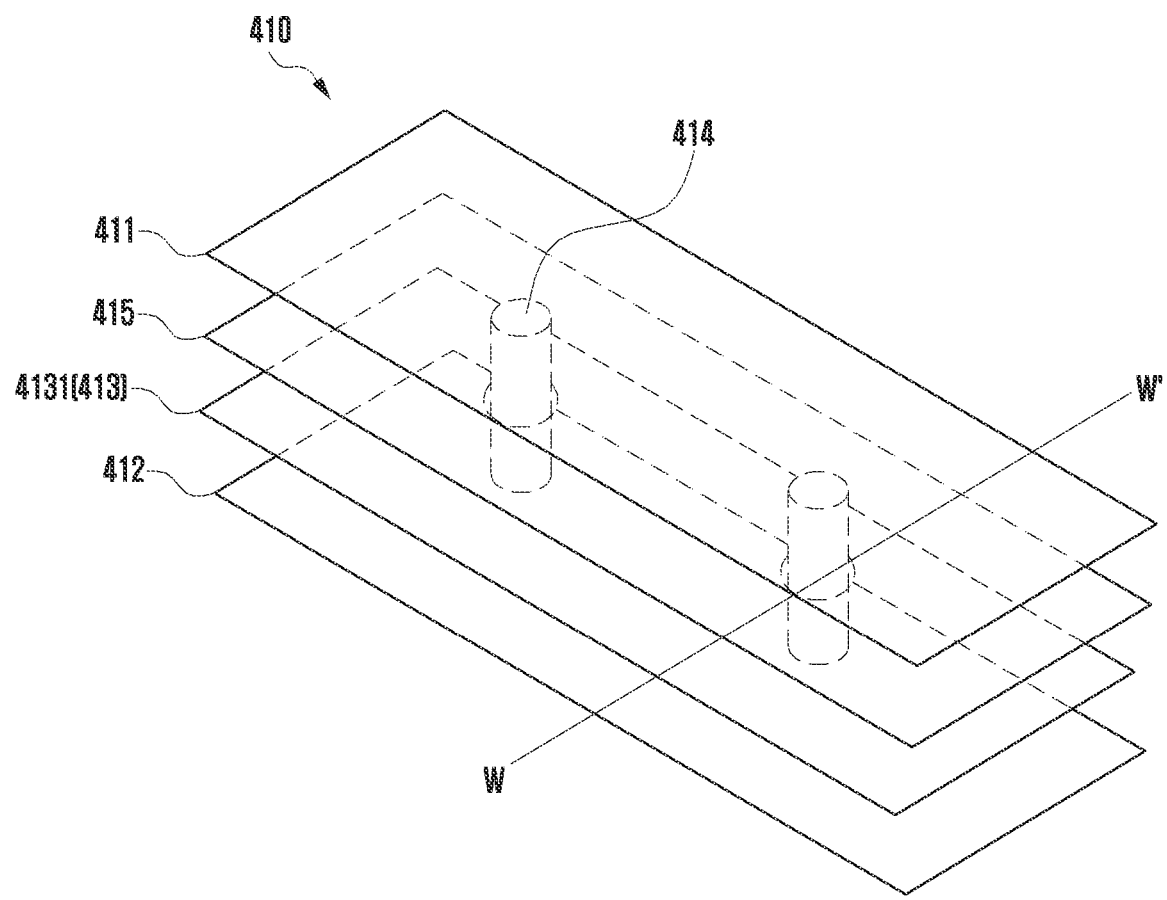
FIG. 7A is a perspective view illustrating a power transmitter according to an embodiment of the disclosure.

FIG. 7A is a perspective view illustrating a power circuit 410 according to an embodiment of the disclosure.

Figure 7B:
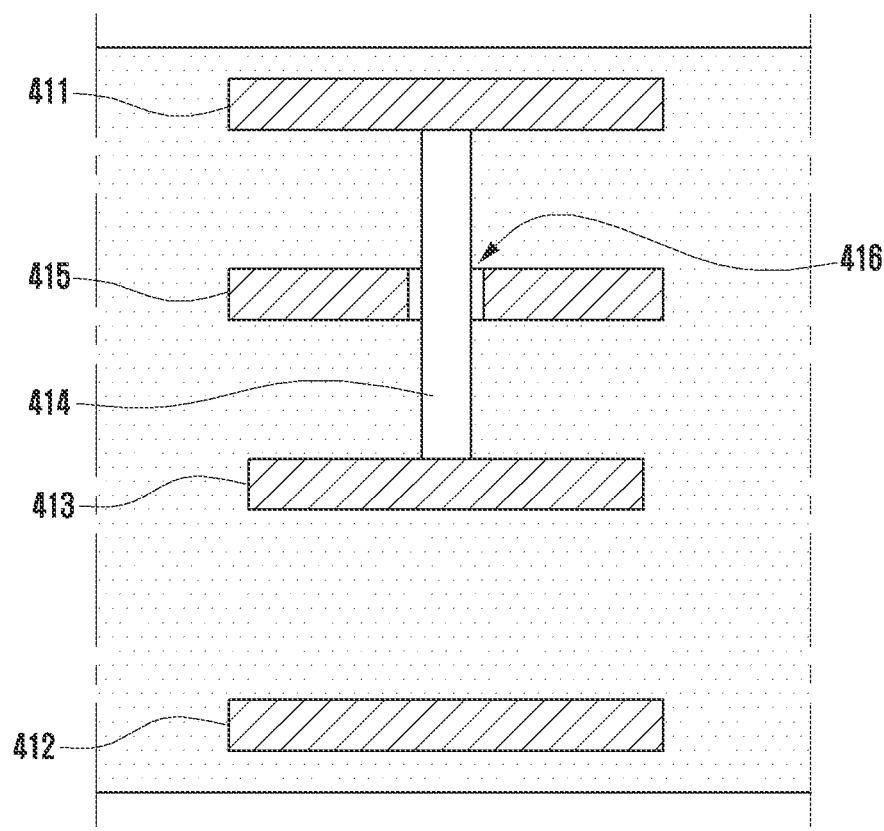
FIG. 7B is a cross-sectional view illustrating a power transmitter according to an embodiment of the disclosure.

FIG. 7B is a cross-sectional view illustrating a power circuit 410 according to an embodiment of the disclosure.

FIG. 7B illustrates a cross section taken in W-W' direction in FIG. 7A.

Referring to FIGS. 7A and 7B, the power circuit 410 according to various embodiments may include a fourth wire 415. For example, the flexible printed cable 400 (such as flexible printed circuit board) includes a fourth layer disposed between the first layer 401 and the second layer 402, and the fourth wire 415 may be disposed on the fourth layer. The fourth wire 415 may be located between the first power conductor 411 and the third power conductor 413. In various embodiments, the fourth wire 415 may be electrically spaced apart from the first vias 414. For example, the fourth wire 415 includes through holes 416 through which the first vias 414 pass, respectively.

In some embodiments, the fourth wire 415 may be a wire that supplies second power that is different from the power supplied through the first power conductor 411 in terms of voltage, current, and/or bias. In another embodiment, the fourth wire 415 may be a wire for digital data communication.

By being located between the first power conductor 411 and the third power conductor 413, the fourth wire 415 may also receive a protection (filtering) effect against EMI applied from the outside of the power circuit 410 (e.g., the RF signal circuit 420) by the electromagnetic band-gap structure of the power circuit 410. Therefore, noise introduced into the second power source or digital data communication may be reduced.

Cables 400 according to an example of the disclosure and a comparative example were manufactured and scattering parameters (S-parameters) and crosstalk were measured. Experimental results are illustrated in FIGS. 8A and 8B.

Figure 8A:
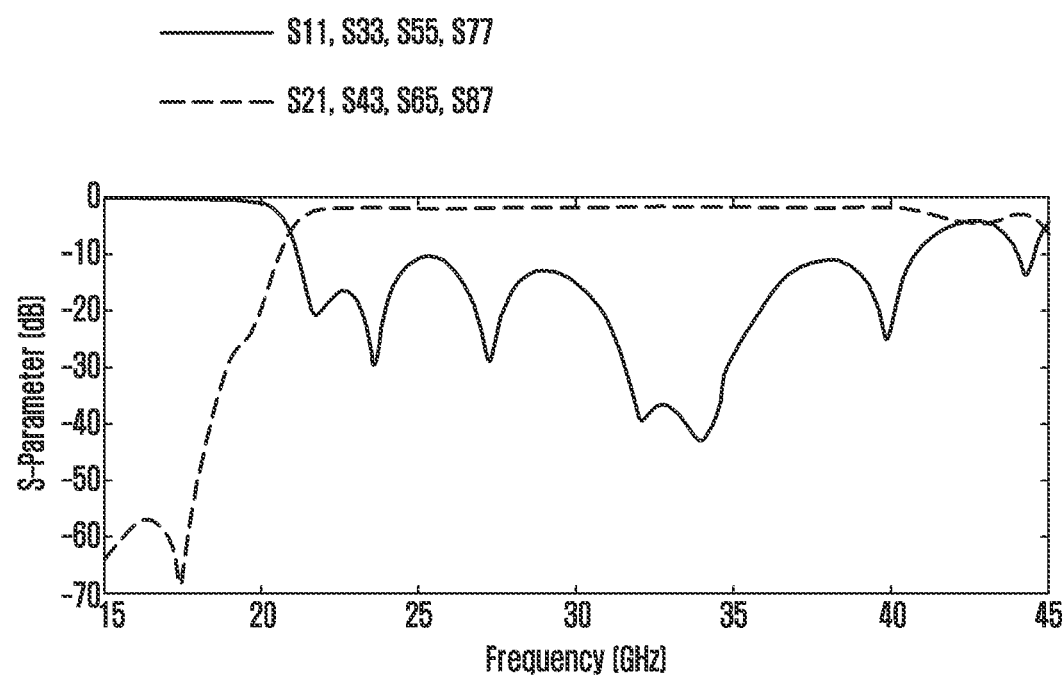
FIG. 8A illustrates S-parameter graphs showing a frequency matching characteristic and a transmission/reception characteristic of an electronic device according to an embodiment of the disclosure.

FIG. 8A illustrates S-parameter graphs showing a frequency matching characteristic and a transmission/reception characteristic of an electronic device according to an embodiment of the disclosure.

Figure 8B:
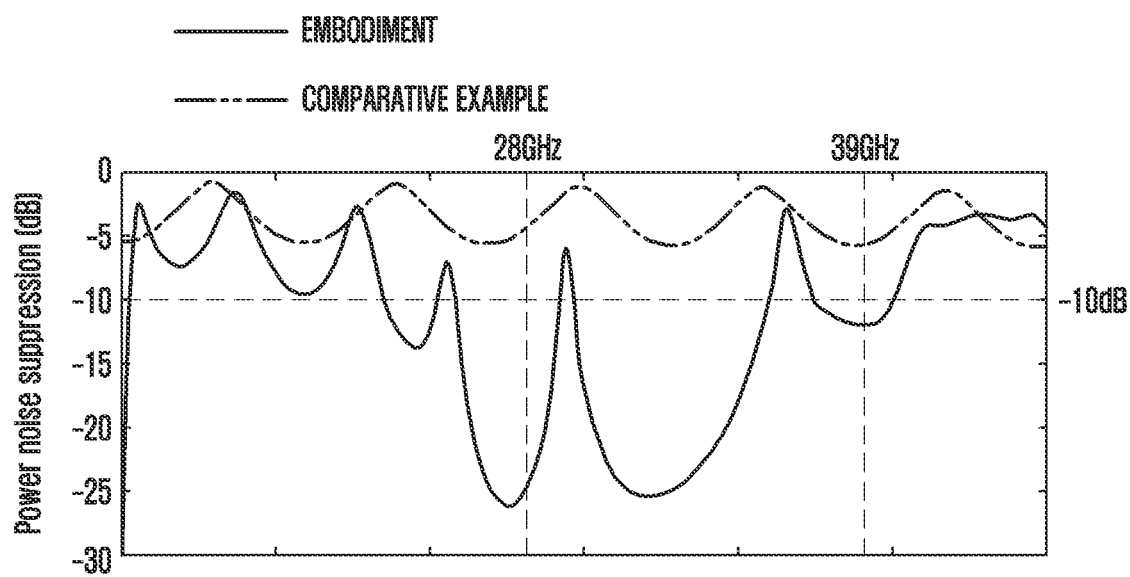
FIG. 8B illustrates graphs illustrating crosstalk characteristics of power transmitters of electronic devices and a comparative example according to an embodiment of the disclosure.

FIG. 8B illustrates graphs showing crosstalk characteristics of a power transmitters of electronic devices and a comparative example according to an embodiment of the disclosure.

The graph S11, S33, S55, S77 in FIG. 8A is a graph showing values obtained by measuring signals reflected to input terminals S1, S3, S5, and S7 by transmitting signals to input terminals S1, S3, S5, and S7 in the RF signal circuit 420 illustrated in FIG. 4C and shows the measured frequency matching characteristics of the RF signal circuit 420. The graph S21, S43, S65, S87 is a graph indicating values obtained by measuring signals received at output terminals S2, S4, S6, and S8 by transmitting signals to input terminals S1, S3, S5, and S7 in the RF signal circuit 420 illustrated in FIG. 4C and shows the transmission/reception characteristics of the RF signal circuit 420.

FIG. 8B illustrates graphs indicating the degrees of attenuation of noise measured in power transmitters 410 by manufacturing an electronic device according to an embodiment of the disclosure and an electronic device, which did not include the electromagnetic band-gap structure of the disclosure, according to a comparative example.

Referring to FIG. 8A, in the graph S11, S33, S55, S77, it can be seen that the RF signal circuit 420 according to an embodiment of the disclosure has a low reflectance in a band of 20 gigahertz (GHZ) to 40 GHz. This shows that the plurality of substrate-integrated waveguides of the RF signal circuit 420 of the disclosure have good frequency matching with an RF signal transmitted through the RF signal circuit 420.

Referring to the graph S21, S43, S65, S87 of FIG. 8A, it can be seen that the RF signal circuit 420 according to an embodiment of the disclosure has a low attenuation rate in the 20-40 GHz band. Therefore, it can be seen that the RF signal circuit 420 of the disclosure is able to transmit an RF signal having the above-mentioned frequency band well.

Referring to FIG. 8B, the electronic device according to the comparative example was able to generally obtain noise attenuation of up to −5 dB in the 14-45 GHZ band, but the electronic device according to the disclosure was able to obtain noise attenuation of up to −25 dB. Thus, the electronic device according to the disclosure is excellent compared to that of the comparative example in terms of the noise suppression ability. In particular, in the 28 GHz band used in the 5G communication, compared to the comparative example, the disclosure exhibited better noise attenuation by −20.5 dB, and even in the 39 GHz band, the disclosure obtained noise attenuation exceeding −10 dB and thus exhibited better noise attenuation by −6.5 dB compared to the comparative example. Therefore, it can be seen that according to an embodiment of the disclosure, it is possible to effectively prevent and/or reduce crosstalk from the RF signal circuit 420 to the power circuit 410.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first printed circuit board;
   a second printed circuit board; and
   a flexible printed circuit board (FPCB) providing electrical connection between the first and second circuit board,
   wherein the FPCB comprises:
   an RF signal circuit configured to transmit or receive at least one RF signal; and
   a power circuit configured to transmit electric power,
   wherein the power circuit comprises:
      a first power conductor comprising a conductive material,
      a second power conductor comprising a conductive material and electrically spaced apart from the first power conductor in a first direction,
      a third power conductor disposed between the first power conductor and the second power conductor in parallel with the second power conductor and electrically spaced apart from the second power conductor in the first direction, and
      at least one first via electrically connecting the first power conductor and the third power conductor.

2. The electronic device of claim 1,
   wherein the second power conductor and a power conductor wire are configured to form a capacitor having a capacitance value,
   wherein the first via is configured to form an inductor having an inductance value when the electric power is transmitted through the power circuit, and
   wherein the capacitor and inductor are configured to filter one or more frequency band of the RF signal when the RF signal is transmitted or received through the RF signal circuit.

3. The electronic device of claim 2, wherein the capacitance value is determined by a width of the second power conductor and a distance between the second power conductor and the third power conductor.

4. The electronic device of claim 2,
   wherein the power circuit comprises a plurality of the first vias, and
   wherein the inductance is determined by an arrangement interval and a number of the plurality of the first vias.

5. The electronic device of claim 4,
   wherein the first vias are arranged in a plurality of rows in a direction in which the first power conductor extends, and
   wherein the capacitance value is determined by a number of the rows of the first vias.

6. The electronic device of claim 1,
   wherein the RF signal circuit comprises:
   a first conductor having one surface oriented in the first direction;

a second conductor located in parallel to the first conductor in the first direction with respect to the first conductor; and a plurality of second vias electrically connecting the first conductor and the second conductor, and wherein the first conductor, the second conductor and the plurality of second vias define a substrate-integrated waveguide.

7. The electronic device of claim 1, wherein the RF signal circuit includes a first RF signal circuit and a second RF circuit, and wherein the power circuit is located between the first RF signal circuit and the second RF signal circuit.

8. The electronic device of claim 1, wherein the FPCB comprises:

a first layer having one surface oriented in the first direction, a second layer disposed in parallel to the first layer in the first direction with respect to the first layer, a third layer disposed in parallel to the second layer in the first direction with respect to the second layer, and an insulating material comprising an electrically insulating and flexible material and disposed between adjacent ones of the first layer, the second layer, and the third layer, wherein the first power conductor is disposed on the first layer, wherein the second power conductor is disposed on the third layer, and wherein the power conductor is disposed on the second layer.

9. The electronic device of claim 8, wherein the RF signal circuit comprises:

a first conductor disposed side by side with the first power conductor on the first layer, a second conductor disposed side by side with the power conductor on the second layer, a third conductor disposed side by side with the power conductor on the third layer, a plurality of second vias electrically connecting an edge of the first conductor and an edge of the second conductor, and a plurality of third vias electrically connecting an edge of the third conductor and the edge of the second conductor, wherein the first conductor, the second conductor, and the second vias define a first substrate-integrated waveguide, and wherein the second conductor, the third conductor, and the third vias define a second substrate-integrated waveguide.

10. The electronic device of claim 8, wherein the FPCB comprises a fourth layer disposed between the first layer and the second layer.

11. The electronic device of claim 10, wherein the power circuit further comprises a fourth wire disposed on the fourth layer and comprising plurality of through holes through which the first via pass.

12. The electronic device of claim 1, wherein the third power conductor comprises at least one segment connected to the at least one first via.

13. A flexible printed circuit board (FPCB) for an electronic device, the FPCB comprising:

a radio frequency (RF) signal circuit configured to transmit an RF signal; and a power circuit configured to transmit electric power, wherein the power circuit comprises:

a first power conductor comprising a conductive material, a second power conductor comprising a conductive material and electrically spaced apart from the first power conductor in a first direction, a third power conductor disposed between the first power conductor and the second power conductor in parallel with the second power conductor and electrically spaced apart from the second power conductor, and at least one first via electrically connecting the first power conductor and the third power conductor.

14. The flexible printed circuit board of claim 13, wherein the second power conductor and the third power conductor are configured form a capacitor having a capacitance value, wherein the first via is configured to form an inductor having an inductance value with the first power conductor and the third power conductor, and wherein the capacitor and inductor are configured to filter one or more frequency band of the RF signal when the RF signal is transmitted or received through the RF signal circuit.

15. The flexible printed circuit board of claim 14, wherein the capacitance value is determined by a width of the second power conductor and a distance between the second power conductor and a third power wire.

16. The flexible printed circuit board of claim 14, further comprising:

a power transmitter comprising a plurality of the first vias, wherein the inductance is determined by an arrangement interval and a number of the plurality of the first vias.

17. The flexible printed circuit board of claim 16, wherein the first vias are arranged in a plurality of rows in a direction in which the first power conductor extends, and wherein the capacitance value is determined by a number of the rows of the first vias.

18. The flexible printed circuit board of claim 13, wherein the RF signal circuit comprises:

a first conductor having one surface oriented in the first direction;

a second conductor located in parallel to the first conductor in the first direction with respect to the first conductor; and a substrate-integrated waveguide comprising a plurality of second vias located at edges of the first conductor and the second conductor and electrically connecting the first conductor and the second conductor.

19. The flexible printed circuit board of claim 16, further comprises a first RF signal circuit and a second RF signal circuit, wherein the power transmitter is located between the first RF signal circuit and the second RF signal circuit.

20. The flexible printed circuit board of claim 13, further comprising:

a first layer having one surface oriented in the first direction;

a second layer disposed in parallel to the first layer in the first direction with respect to the first layer;

a third layer disposed in parallel to the second layer in the first direction with respect to the second layer; and an insulating material comprising an electrically insulating and flexible material and disposed between adjacent ones of the first layer, the second layer, and the third layer, wherein the first power conductor is disposed on the first layer, wherein the second power conductor is disposed on the third layer, and wherein the third power conductor is disposed on the second layer.

21. The flexible printed circuit board of claim 20, wherein the flexible printed circuit board comprises the RF signal circuit disposed side by side with the first, second and third power conductors, wherein the RF signal circuit comprises:

a first conductor disposed side by side with the first power conductor on the first layer, a second conductor disposed side by side with the third power conductor on the second layer, a third conductor disposed side by side with the second power conductor on the third layer, a plurality of second vias electrically connecting an edge of the first conductor and an edge of the second conductor, and a plurality of third vias electrically connecting an edge of the third conductor and the edge of the second conductor, wherein the first conductor, the second conductor, and the second vias define a first substrate-integrated waveguide, and wherein the second conductor, the third conductor, and the third vias define a second substrate-integrated waveguide.

22. The flexible printed circuit board of claim 20, comprising a fourth layer disposed between the first layer and the second layer.

23. The flexible printed circuit board of claim 13, where the flexible printed circuit board is formed as a flexible flat cable (FFC), or a flexible printed cable (FPC).

* * * * *